3,079,245
METHOD OF ENRICHING SOIL IN PLANT-ASSIMILABLE NITROGEN AND SULFUR
Donald C. Young, Fullerton, Calif., assignor, by mesne assignments, to Collier Carbon and Chemical Corporation, a corporation of California
No Drawing. Filed Mar. 12, 1956, Ser. No. 570,686
4 Claims. (Cl. 71—54)

This invention relates to liquid fertilizing compositions comprising ammonia and sulfur in assimilable form, and in particular relates to compositions of this nature which are substantially non-corrosive with respect to ferrous metals.

Within recent years the use of aqueous ammonia as a plant nutrient or fertilizer has become widespread, particularly in the western area of the United States. Usually, the aqueous ammonia, which is commonly supplied at 20–30 percent concentration, is admixed with the irrigation water which is normally employed in such areas so as to provide an ammonia concentration of about 50–500 p.p.m. in such water. In many areas where aqueous ammonia is so employed it has been found that the local soil is deficient in sulfur, and it has become the practice to incorporate small quantities of ammonium sulfate into the aqueous ammonia which is sold in such areas for fertilizer use. Usually, this is accomplished simply by adding sufficient sulfuric acid to the aqueous ammonia to effect the formation of about 5–10 percent of ammonium sulfate. A commonly employed ammonia-ammonium sulfate composition of this type bears the fertilizer designation "20–0–0–2" (meaning that it contains 20 percent by weight of nitrogen and 2 percent by weight of sulfur), and consists of an aqueous solution containing about 22.2 percent by weight of ammonia and about 8.25 percent by weight of ammonium sulfate. Unfortunately, however, mixed ammonia-ammonium sulfate compositions of this nature are highly corrosive with respect to ferrous metals, and the storage and transportation of such compositions in ordinary iron or steel equipment presents all of the problems, economic and otherwise, inherent in handling corrosive liquids. Furthermore, the corrosion products are highly abrasive, and if they are allowed to remain in the composition they cause very serious erosion in pumps, meters and other expensive handling equipment.

It is accordingly an object of the present invention to provide substantially non-corrosive liquid compositions comprising ammonia and sulfur in a form assimilable by plants.

A further object is to provide improved liquid fertilizing compositions for use in nitrogen- and sulfur-dificient soils.

Other and related objects will be apparent from the following detailed description of the invention, and various advantages thereof not specifically referred to herein will be aparent to those skilled in the art upon employment of the invention in practice.

I have now found that the above objects and attendant advantages may be realized in compositions essentially comprising aqueous ammonia having dissolved therein relatively small amounts of ammonium sulfied or polysulfide. More particularly, I have found that compositions prepared by adding small amounts of ammonium sulfide or polysulfide to ordinary agricultural aqueous ammonia are substantially non-corrosive with respect to ferrous metals and are capable of supplying both nitrogen and sulfur to the soil and to plants growing therein. The invention thus consists in aqueous solutions comprising free ammonia and ammonium sulfide or polysulfide in the proportions hereinafter set forth in detail, and in the application of such solutions to the soil as fertilizers.

I am aware that it has been proposed to apply aqueous solutions of ammonium and alkali-metal polysulfides to plant life and to the soil for the purpose of controlling fungus and other parasitic organisms, and that such compositions have been formulated so as to comprise small quantities, e.g., 0.1 to 3 percent, of free ammonia so that the weight ratio of total sulfur to free ammonia is of the order of 19 to 1. Such compositions, however, have little if any fertilizing value, and are completely outside the scope of the present invention, which is limited to compositions in which the ratio of total sulfur to free ammonia is of the order of 0.02/1 to 0.2/1.

According to a preferred embodiment of the invention, the sulfur-containing component of the new compositions is provided in the form of an aqueous ammonium polysulfide concentrate conntaining about 18–27 percent by weight of nitrogen calculated as ammonia and about 40–50 percent by weight of sulfur, of which about 20–24 percent is sulfide sulfur and the remainder is polysulfide sulfur. A typical concentrate of this type contains about 65–75 percent ammonium polysulfide in which the ratio of polysulfide sulfur to sulfide sulfur is about 1/1, and about 35–25 percent water. If desired, however, ammonium sulfied, $(NH_4)_2S$, and other forms of ammonium polysulfide in which the ratio of polysulfide sulfur to sulfide sulfur is as high as 8/1 may be employed. As is well known, ammonium sulfide may be prepared simply by absorbing hydrogen sulfide in aqueous ammonia, and the polysulfide is obtained by thereafter dissolving sufficient free sulfur in the ammonium sulfide to obtain the desired ratio of polysulfide sulfur to sulfide sulfur.

The amount of ammonium sulfide or polysulfide contained in the new compositions will depend primarily upon the extent of the sulfur deficiency in the soil to which the composition is to be applied. Ordinarily, however, the composition should contain between about 0.02 and about 0.2 part of sulfur per part of ammonia. A preferred composition comprises aqueous ammonia of about 20–27 percent ammonia concentration having dissolved therein about 4.0–5.0 percent of the aforementioned concentrate composition comprising about 24 percent of ammonia and about 45 percent total sulfur. Such composition corresponds to the fertilizer designation 20–0–0–2, meaning that it contains 20 percent total nitrogen and 2 percent total sulfur.

The new compositions are most conveniently prepared simply by admixing the two components in a suitable vessel at atmospheric temperature, although if desired they may be formed by passing hydrogen sulfide into aqueous ammonia to form the required amount of ammonium sulfide, and if desired thereafter adding elemental sulfur to form the polysulfide. Alternatively, anhydrous ammonia may be added in suitable amount to an aqueous solution of ammonium sulfide or polysulfide.

In order to demonstrate the non-corrosive character of the new compositions, the following test procedure has been employed: Mild steel (ASTM A–283) test specimen, approximately 1" x ½" x ³⁄₁₆", were polished with No. 150 and No. 240 Alundum paper and are then vapor-degreased above boiling isopropanol and accurately weighed. Two specimens are mounted on a glass rack which is suspended from a rocking arm in a glass vessel containing 200 ml. of the composition to be tested. The arms is mechanically connected to a motor controlled by a cycle timer so that the test specimen is gradually moved in and out of the test composition in periodic steps. The apparatus is allowed to operate at room temperature in the presence of air for a given period of time, after which the test specimens are removed, washed in distilled water, and weighed. The following table presents the data obtained by subjecting a number of test compositions to such procedure. The ammonium polysulfide was employed in the form of the aforesaid concentrate composition containing about 18 percent nitrogen and about 45% sulfur.

| Test No. | | Duration of Test, days | Wt. Loss gm./M²/day | Appearance of Composition |
|---|---|---|---|---|
| 1 | Aqueous ammonia (20%)+ 8.25% ammonium sulfate. | 10 | 30.33 | Heavy sludge of rust. |
| 2 | Aqueous ammonia (20%)+ 4.5% ammonium polysulfide. | 16 | 0.00 | Clear. |
| 3 | Aqueous ammonia (20%)+ 6.7% ammonium polysulfide. | 16 | 0.00 | Do. |
| 4 | Aqueous ammonia (20%)+ 4.25% ammonium sulfide. | 20 | 0.00 | Do. |

In order to demonstrate that the sulfur in the present composition is readily assimilated by plant life, the following procedure was followed: Forty wheat seeds were planted ½" deep in 6-inch glass funnels filled with substantially sulfur-free sterilized silica sand. The seeds were irrigated with various test solutions every four days over a three-week growing period in a greenhouse at 75°–80° F. At the end of such period, the tops of the plants were cut off at the level of the sand, oven-dried at 110° F. for 48 hours, and then analyzed for sulfur. The roots were removed from the sand and were likewise dried, weighed and analyzed for sulfur. The results of these tests are tabulated as follows:

The foregoing data clearly demonstrate that the present compositions are superior to the previously known ammonia-ammonium sulfate compositions, both with respect to corrosivity and the ability to supply sulfur to plant life.

Other modes of applying the principle of my invention may be employed instead of those explained, change being made as regards the materials or procedure employed provided the products or steps stated by any of the following claims, or the equivalent of such stated products or steps, be obtained or employed.

I, therefore, particularly point out and distinctly claim as my invention:

1. The method of enriching soil in plant-assimilable nitrogen and sulfur which comprises applying to the soil a composition comprising an aqueous solution containing between about 50 and about 500 parts per million of free ammonia and a compound selected from the class of ammonium sulfide and ammonium polysulfide, said composition containing between about 0.02 and about 0.2 part by weight of sulfur contained in said compound per part by weight of free ammonia, and said free ammonia and said compound constituting substantially the sole plant nutrient material present in said composition.

2. A method as defined by claim 1 wherein the said compound is ammonium sulfide.

3. A method as defined by claim 1 wherein the said compound is ammonium polysulfide in which the ratio of polysulfide sulfur to sulfide sulfur is between about 1/1 and about 8/1.

4. A method as defined by claim 3 in which the ammonium polysulfide is employed in the form of an aqueous solution containing about 18 and about 27 percent by weight of nitrogen calculated as ammonia and between about 40 and about 50 percent by weight of sulfur.

| Expt. No. | Nutrient Solution | Concentration, p.p.m. | | Plant Tops | | Plant Roots, Percent Sulfur |
|---|---|---|---|---|---|---|
| | | Nitrogen | Sulfur | Weight, gms. | Percent Sulfur | |
| 1 | 22% aqueous ammonia containing 2% total sulfur as ammonium polysulfide + nutrient ¹ Solution A. | 150 | 150 | 0.26 | 0.49 | 0.58 |
| 2 | 22% aqueous ammonia containing 0.08% ammonium sulfate + nutrient ¹ Solution A. | 150 | 150 | 0.17 | 0.34 | 0.32 |
| 3 | 22% aqueous ammonia + nutrient ¹ Solution A. | 150 | 0 | 0.23 | 0.0 | 0.01 |
| 4 | Nutrient ¹ Solution A. | 0 | 0 | 0.10 | 0.08 | 0.02 |
| 5 | Distilled Water. | 0 | 0 | 0.07 | 0.0 | 0.0 |

¹ See the following table:

```
                                                                    gm./l
CaCl₂ -------------------------------------------------------------- 0.1
KH₂PO₄ ------------------------------------------------------------- 0.87
MgCl₂ -------------------------------------------------------------- 0.09
Fe citrate --------------------------------------------------------- 0.005
MnCl₂·H₂O ---------------------------------------------------------- 0.39
H₃PO₃ -------------------------------------------------------------- 0.001
ZnCl₂ -------------------------------------------------------------- 0.02
```

References Cited in the file of this patent

UNITED STATES PATENTS

| | | |
|---|---|---|
| 1,855,856 | Hansen | Apr. 26, 1932 |
| 2,086,717 | Kniskern et al. | July 13, 1937 |
| 2,220,059 | Beekuis et al. | Nov. 5, 1940 |
| 2,231,423 | Horsley et al. | Feb. 11, 1941 |
| 2,238,651 | Keenen | Apr. 15, 1941 |
| 2,663,628 | Thomsen | Dec. 22, 1953 |